US010089624B2

(12) United States Patent
Hammad et al.

(10) Patent No.: US 10,089,624 B2
(45) Date of Patent: *Oct. 2, 2018

(54) CONSUMER AUTHENTICATION SYSTEM AND METHOD

(75) Inventors: Ayman Hammad, Pleasanton, CA (US); Patrick Faith, Pleasanton, CA (US); Mark Carlson, Half Moon Bay, CA (US)

(73) Assignee: VISA U.S.A. INC., San Francisco, CA (US)

( * ) Notice: Subject to any disclaimer, the term of this patent is extended or adjusted under 35 U.S.C. 154(b) by 1240 days.

This patent is subject to a terminal disclaimer.

(21) Appl. No.: 13/352,247

(22) Filed: Jan. 17, 2012

(65) Prior Publication Data

US 2012/0158591 A1    Jun. 21, 2012

Related U.S. Application Data

(62) Division of application No. 11/763,240, filed on Jun. 14, 2007, now Pat. No. 8,135,647.

(Continued)

(51) Int. Cl.
*G06Q 20/00* (2012.01)
*G06Q 20/38* (2012.01)
(Continued)

(52) U.S. Cl.
CPC ....... *G06Q 20/3829* (2013.01); *G06Q 20/085* (2013.01); *G06Q 20/20* (2013.01);
(Continued)

(58) Field of Classification Search
None
See application file for complete search history.

(56) References Cited

U.S. PATENT DOCUMENTS 4,528,442 A * 7/1985 Endo .................. G07F 7/10
235/379
5,177,342 A * 1/1993 Adams ............... G06Q 20/403
235/379

(Continued)

FOREIGN PATENT DOCUMENTS

| CA | 2267672 A1 | 8/2000 |
| CA | 2474600 | 9/2009 |

(Continued)

OTHER PUBLICATIONS

Notice of 3rd Office Action, dated Jan. 6, 2015, for Chinese Application No. 200780022874.5, 15 pages.

(Continued)

*Primary Examiner* — Jamie R Kucab
(74) *Attorney, Agent, or Firm* — Kilpatrick Townsend & Stockton LLP

(57) ABSTRACT

A method for authenticating a consumer. The method includes receiving an authorization request message associated with a consumer conducting a transaction with a portable consumer device. A challenge message is sent to the consumer, where the challenge message is dynamic or semi-dynamic. A challenge response message is received from the consumer, and an authorization response message is sent to the consumer. The authorization response message indicates whether or not the transaction is authorized.

17 Claims, 6 Drawing Sheets

Related U.S. Application Data

(60) Provisional application No. 60/884,089, filed on Jan. 9, 2007, provisional application No. 60/815,430, filed on Jun. 20, 2006, provisional application No. 60/815,059, filed on Jun. 19, 2006.

(51) Int. Cl.
*G06Q 20/08* (2012.01)
*G06Q 20/20* (2012.01)
*G06Q 20/36* (2012.01)
*G06Q 20/40* (2012.01)
*G06Q 30/06* (2012.01)
*G06Q 40/00* (2012.01)
*H04L 9/32* (2006.01)
*G06Q 20/10* (2012.01)

(52) U.S. Cl.
CPC ...... *G06Q 20/367* (2013.01); *G06Q 20/3672* (2013.01); *G06Q 20/3674* (2013.01); *G06Q 20/382* (2013.01); *G06Q 20/385* (2013.01); *G06Q 20/3821* (2013.01); *G06Q 20/40* (2013.01); *G06Q 20/401* (2013.01); *G06Q 30/06* (2013.01); *G06Q 40/00* (2013.01); *H04L 9/3271* (2013.01); *G06Q 20/105* (2013.01); *G06Q 20/204* (2013.01); *G06Q 2220/00* (2013.01); *H04L 2209/56* (2013.01)

(56) References Cited

U.S. PATENT DOCUMENTS

| | | |
|---|---|---|
| 5,254,843 A | 10/1993 | Hynes et al. |
| 5,311,594 A * | 5/1994 | Penzias .......... G06Q 20/04 379/189 |
| 5,420,926 A | 5/1995 | Low et al. |
| 5,434,398 A | 7/1995 | Goldberg |
| 5,465,387 A | 11/1995 | Mukherjee |
| 5,513,250 A | 4/1996 | McAllister |
| 5,530,438 A | 6/1996 | Bickham et al. |
| 5,539,810 A | 7/1996 | Kennedy et al. |
| 5,615,110 A | 3/1997 | Wong |
| 5,625,689 A | 4/1997 | Indeck et al. |
| 5,627,355 A | 5/1997 | Rahman et al. |
| 5,708,422 A * | 1/1998 | Blonder .......... G06Q 20/40 340/5.41 |
| 5,740,244 A | 4/1998 | Indeck et al. |
| 5,774,525 A | 6/1998 | Kanevsky et al. |
| 5,812,668 A | 9/1998 | Weber |
| 5,819,226 A | 10/1998 | Gopinathan et al. |
| 5,834,747 A | 11/1998 | Cooper |
| 5,872,834 A | 2/1999 | Teitelbaum |
| 5,878,337 A | 3/1999 | Joan et al. |
| 5,903,830 A | 5/1999 | Joao et al. |
| 5,914,472 A | 6/1999 | Foladare et al. |
| 5,920,628 A | 7/1999 | Indeck et al. |
| 5,988,497 A | 11/1999 | Wallace |
| 6,012,144 A | 1/2000 | Pickett |
| 6,029,154 A | 2/2000 | Pettitt |
| 6,064,990 A | 5/2000 | Goldsmith |
| 6,095,413 A | 8/2000 | Tetro et al. |
| 6,157,707 A | 12/2000 | Baulier et al. |
| 6,219,793 B1 | 4/2001 | Li et al. |
| 6,260,146 B1 | 7/2001 | Mos et al. |
| 6,263,447 B1 | 7/2001 | French et al. |
| 6,308,890 B1 | 10/2001 | Cooper |
| 6,327,578 B1 | 12/2001 | Linehan |
| 6,330,550 B1 | 12/2001 | Brisebois et al. |
| 6,442,532 B1 | 8/2002 | Kawan |
| 6,496,936 B1 | 12/2002 | French et al. |
| 6,529,725 B1 | 3/2003 | Joao et al. |
| 6,535,855 B1 | 3/2003 | Cahill et al. |
| 6,612,488 B2 | 9/2003 | Suzuki |
| 6,684,250 B2 | 1/2004 | Anderson et al. |
| 6,714,918 B2 | 3/2004 | Hillmer et al. |
| 6,832,721 B2 | 12/2004 | Fujii |
| 6,836,670 B2 | 12/2004 | Casstrogiovanni et al. |
| 6,857,073 B2 | 2/2005 | French et al. |
| 7,003,497 B2 | 2/2006 | Maes |
| 7,231,657 B2 * | 6/2007 | Honarvar .......... G06Q 10/10 709/225 |
| 7,249,093 B1 | 7/2007 | King |
| 7,272,728 B2 | 9/2007 | Pierson |
| 7,273,168 B2 | 9/2007 | Linlor |
| 7,330,871 B2 | 2/2008 | Barber |
| 7,343,149 B2 | 3/2008 | Benco |
| 7,357,310 B2 | 4/2008 | Calabrese et al. |
| 7,373,669 B2 | 5/2008 | Eisen |
| 7,430,537 B2 | 9/2008 | Templeton et al. |
| 7,500,607 B2 | 3/2009 | Williams |
| 7,545,748 B1 | 4/2009 | Riddle |
| 7,548,890 B2 | 6/2009 | Shakkarwar |
| 7,620,600 B2 * | 11/2009 | Patil ............. G06Q 30/06 705/39 |
| 8,135,647 B2 * | 3/2012 | Hammad .......... G06Q 20/085 235/380 |
| 2002/0007352 A1 | 1/2002 | Fieschi et al. |
| 2002/0035622 A1 | 3/2002 | Barber |
| 2002/0077978 A1 * | 6/2002 | O'Leary ............ G06Q 20/04 705/40 |
| 2003/0050896 A1 | 3/2003 | Wiederin |
| 2003/0140004 A1 | 7/2003 | O'Leary et al. |
| 2003/0154406 A1 * | 8/2003 | Honarvar .......... G06Q 10/10 726/10 |
| 2004/0019564 A1 * | 1/2004 | Goldthwaite ...... G06Q 20/04 705/44 |
| 2004/0078340 A1 * | 4/2004 | Evans ............. G06Q 20/10 705/64 |
| 2005/0097320 A1 * | 5/2005 | Golan ............. G06F 21/40 713/166 |
| 2005/0122209 A1 | 6/2005 | Black |
| 2005/0240527 A1 | 10/2005 | Goldman |
| 2005/0273442 A1 * | 12/2005 | Bennett .......... G06Q 20/3674 705/67 |
| 2005/0278542 A1 | 12/2005 | Pierson et al. |
| 2006/0010072 A1 | 1/2006 | Eisen |
| 2006/0156385 A1 * | 7/2006 | Chiviendacz ......... G06F 21/36 726/2 |
| 2007/0124801 A1 | 5/2007 | Thomas |
| 2007/0143230 A1 * | 6/2007 | Narainsamy ........ G06Q 10/10 705/75 |
| 2007/0174448 A1 | 7/2007 | Ahuja et al. |
| 2007/0214151 A1 | 9/2007 | Thomas et al. |
| 2007/0234409 A1 | 10/2007 | Eisen |
| 2007/0239606 A1 | 10/2007 | Eisen |
| 2007/0244830 A1 | 10/2007 | Hilderman |
| 2008/0040276 A1 | 2/2008 | Hammad et al. |
| 2008/0087722 A1 | 4/2008 | Collins |
| 2008/0103972 A1 | 5/2008 | Lanc |
| 2008/0104684 A1 | 5/2008 | Lunde et al. |
| 2008/0120507 A1 | 5/2008 | Shakkarwar |
| 2008/0133420 A1 | 6/2008 | Barber |
| 2008/0154760 A1 | 6/2008 | Calabrese et al. |
| 2008/0244744 A1 | 10/2008 | Thomas et al. |
| 2008/0255992 A1 | 10/2008 | Lin |
| 2008/0288384 A1 | 11/2008 | Collins et al. |
| 2008/0288405 A1 | 11/2008 | John |
| 2008/0298588 A1 | 12/2008 | Shakkarwar |
| 2008/0319896 A1 | 12/2008 | Carlson et al. |
| 2008/0319904 A1 | 12/2008 | Carlson et al. |
| 2009/0037213 A1 | 2/2009 | Eisen |
| 2009/0048975 A1 | 2/2009 | Felger |
| 2009/0049529 A1 | 2/2009 | Felger |
| 2009/0055315 A1 | 2/2009 | Felger |
| 2009/0083184 A1 | 3/2009 | Eisen |
| 2009/0099961 A1 | 4/2009 | Ogilvy |
| 2009/0204524 A1 | 8/2009 | McGeorge |

(56) References Cited

U.S. PATENT DOCUMENTS

| | | |
|---|---|---|
| 2009/0271306 A1 | 10/2009 | Pierson |
| 2010/0036749 A1 | 2/2010 | Barber et al. |

FOREIGN PATENT DOCUMENTS

| | | |
|---|---|---|
| CN | 1449540 A | 10/2003 |
| JP | 2001-188759 A | 7/2001 |
| JP | 2002-092739 A | 3/2002 |
| JP | 2002-117377 A | 4/2002 |
| JP | 2002-140302 A | 5/2002 |
| JP | 2003-016364 A | 1/2003 |
| JP | 2003-136566 A | 5/2003 |
| JP | 2003-196566 | 7/2003 |
| JP | 2003-337917 A | 11/2003 |
| JP | 2004-272827 A | 9/2004 |
| JP | 2007-513395 A | 5/2007 |
| KR | 1020040103581 A | 12/2004 |
| WO | WO9724825 A2 | 7/1997 |
| WO | 02/01462 A2 | 1/2002 |
| WO | 2003/003704 A2 | 1/2003 |
| WO | WO2004081837 A1 | 9/2004 |
| WO | 2004/104528 A1 | 12/2004 |
| WO | 2005/072382 A2 | 8/2005 |
| WO | 2007/149775 A2 | 12/2007 |

OTHER PUBLICATIONS

Notice of Allowance, dated Dec. 19, 2014, for Korean Application No. 10-2009-7000931, 3 pages.
Office Action for Korean Patent Application No. 2009-7000931 dated Nov. 11, 2013, with English Translation, 14 pages.
Final Office Action for Japanese Patent Application 2009-516645 dated Jul. 2, 2013, with English Translation, 6 pages.
Office Action for Chinese Application No. 200780022874.5 dated Jun. 5, 2012, with English Translation, 7 pages.
International Search Report dated Aug. 5, 2008, for PCT Patent Application No. PCT/US07/71301, 3 pages.
Written Opinion of the International Searching Authority dated Aug. 5, 2008, for PCT Patent Application No. PCT/US07/71301, 3 pages.
Australian Office Action dated Oct. 1, 2010, for AU Patent Application No. 2007261072, 5 pages.
Australian Notice of Acceptance dated Jun. 26, 2011, for AU Patent Application No. 2007261072, 3 pages.
Russian Office Action dated Nov. 18, 2011, for RU Patent Application No. 2009101310/08(001608), English translation only, 7 pages.
Mexican Office Action dated May 24, 2012 for MX Patent Application No. MX/a/2008/016173, 2 pages. (In Spanish—No Translation).
Mexican Office Action dated Nov. 18, 2011 for MX Patent Application No. MX/a/2008/016173, 10 pages. (Translation).
Examination Report dated Dec. 22, 2011, for EP Patent Application No. 07812158.9, 7 pages.
Summons to Attend Oral Proceedings dated Sep. 11, 2013, for EP Patent Application No. 07812158.9, 10 pages.
Korean Office Action dated Nov. 27, 2013 for KR Patent Application No. 10-2009-7000931, English Translation, 7 pages.
Office Action, dated Jul. 16, 2015, for Chinese Patent Application No. 200780022874.5, with English translation, 16 pages.
Office Action, dated Jul. 23, 2015 for Canadian Patent Application No. 2655015, 7 pages.
Decision on Reexamination for Chinese Application No. 200780022874.5, dated Nov. 25, 2014, 5 pages.
Non-Final Office Action for Canadian Application 2,655,015, dated Jul. 31, 2014, 2 pages.
International Preliminary Report on Patentability for PCT Application No. PCT/US07/71301, dated Feb. 3, 2011, 5 pages.
Second Office Action for Chinese Patent Application No. 200780022874.5, dated Oct. 10, 2011, 9 pages.
Office Action for European Patent Application No. EP 07812158.9, dated Dec. 22, 2011, 7 pages.
Office Action for Japanese Patent Application No. 2009-516645, dated Dec. 4, 2012, 6 pages.
Office Action from Chinese Application No. 200780022874.5, dated Jan. 12, 2011 (12 pages).
Supplementary European Search Report from EP 07812158.9, dated Feb. 28, 2011 (7 pages).
Canadian Office Action for Application No. 2655015 dated Aug. 15, 2017, 2 pages.
FDIC, "FFIEC Guidance: Authentication in an Internet Banking Environment", p. 14, Oct. 12, 2005 (Dec. 10, 2005), 15 pages.

\* cited by examiner

CONSUMER AUTHENTICATION SYSTEM AND METHOD

CROSS-REFERENCES TO RELATED APPLICATIONS

This application is a divisional of non-provisional U.S. patent application Ser. No. 11/763,240, filed Jun. 14, 2007, titled "CONSUMER AUTHENTICATION SYSTEM AND METHOD," and claims the benefit of the filing dates of U.S. Provisional Patent Application No. 60/815,059, filed on Jun. 19, 2006, U.S. Provisional Patent Application No. 60/815,430 filed on Jun. 20, 2006, and U.S. Provisional Patent Application No. 60/884,089 filed on Jan. 9, 2007. All of these applications are herein incorporated by reference in their entirety for all purposes.

BACKGROUND

It is desirable to have mechanisms that ensure that a consumer who is using a portable consumer device such as a credit card is really the consumer who is associated with the credit card. Fraudulent activity can be very costly to merchants, issuers of portable consumer devices, and others.

A number of consumer authentication mechanisms are known. In one example of a conventional consumer authentication process, a consumer may purchase gas at a gas station using his credit card. Before the consumer is allowed to buy the gas and before the authorization request message is sent to the issuer of the portable consumer device, the gas pump may request that the consumer supply his zip code. This authentication request may be provided by the merchant as a way to ensure that the consumer is in fact the consumer associated with the credit card. The gas station wants to verify that the consumer is authentic, since the gas station may bear some of the risk for any fraudulent activity that results from purchases made at the gas station.

While such conventional authentication methods are effective, a number of improvements can be made. For example, conventional authentication requests are typically static. If someone has stolen a consumer's portable consumer device and knows the consumer's zip code, for example, that person could still conduct fraudulent transactions using the authentic portable consumer device. Moreover, merchants have limited information about the consumer, and the types of challenges that can be provided at the consumer are limited.

Better ways to authenticate consumers using portable consumer devices are desirable. Embodiments of the invention address the above problems, and other problems, individually and collectively.

SUMMARY OF THE INVENTION

Embodiments of the invention can authenticate a consumer.

One embodiment of the invention is directed to a method comprising receiving an authorization request message associated with a consumer conducting a transaction with a portable consumer device. A challenge message is sent to the consumer, where the challenge message is dynamic or semi-dynamic. A challenge response message is received from the consumer, and an authorization response message is sent to the consumer. The authorization response message indicates whether or not the transaction is authorized.

Another embodiment of the invention is directed to a method comprising initiating an authorization request message, where the authorization request message is associated with a consumer conducting a transaction with a portable consumer device and is sent to an issuer associated with the portable consumer device, receiving a challenge message, wherein the challenge message is dynamic or semi-dynamic, and then initiating a challenge response message, where the challenge response message is responsive to the challenge message. An authorization response message is received, where the authorization response message indicates whether or not the transaction is authorized.

Yet another embodiment of the invention is directed to a method comprising receiving, at an issuer, an authorization request message sent from an access device. In response to receipt of the authorization request message, one or more dynamic challenge questions are provided to the consumer before authorizing a transaction conducted by the consumer.

Yet another embodiment of the invention is directed to a method comprising receiving a first authorization request message associated with a consumer conducting a transaction with a portable consumer device, sending a challenge message to the consumer, receiving a second authorization request message including a challenge response message, and sending an authorization response message to the consumer, wherein the authorization response message indicates whether or not the transaction is authorized.

Another embodiment of the invention is directed to a method comprising sending a first authorization request message associated with a consumer conducting a transaction with a portable consumer device, receiving a challenge message, sending a second authorization request message including a challenge response message; and receiving an authorization response message, wherein the authorization response message indicates whether or not the transaction is authorized.

Other embodiments of the invention are directed to systems, portable consumer devices, and computer readable media associated with the above-described methods.

These and other embodiments of the invention are described in further detail below with reference to the Figures and the Detailed Description.

DETAILED DESCRIPTION

Figure 1:
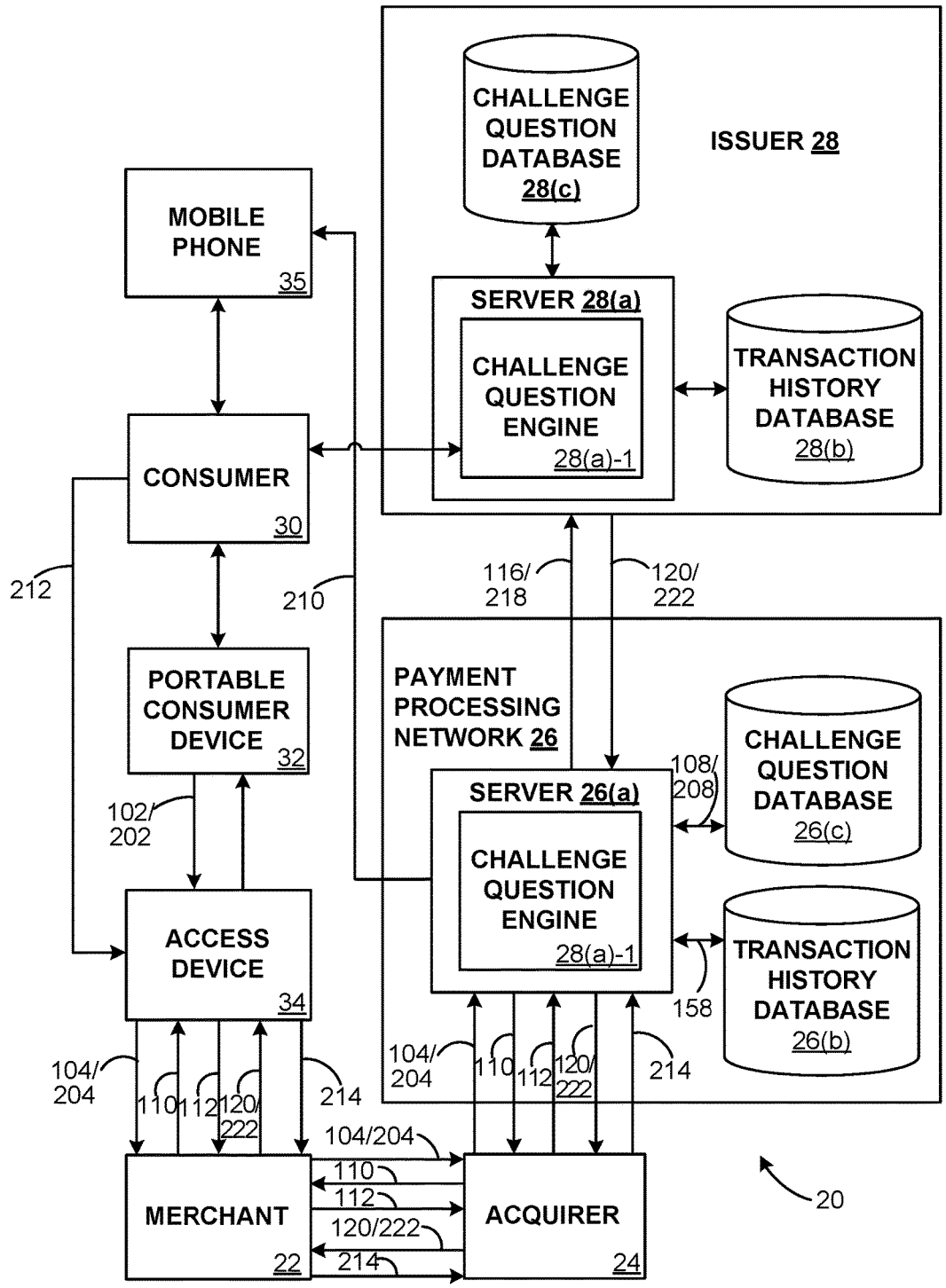
FIG. 1 shows a block diagram of a system according to an embodiment of the invention.

Currently, consumer authentication using challenge questions is typically performed at the merchant. The merchant asks the consumer for identification such as a driver's license before allowing a purchase transaction with a portable consumer device to proceed. In some cases, it may be better to provide for more "back end" consumer authentication processes, whereby an issuer and/or a payment processing organization (such as Visa) verify the identity of the consumer. The issuer and/or the payment processing organization have much more data about the consumer than the merchant and are in a better position to authenticate the consumer. For example, the issuer has information such as the consumer's address, mother's maiden name, etc. In addition, the issuer and the payment processing organization have information such as recent purchase information and consumer purchasing behavior. Any of this information can be used to help authenticate the consumer in a purchase transaction.

Thus, in embodiments of the invention, the payment processing organization, the issuer, or any other non-merchant entity with information about the consumer may pose challenge questions to the consumer to authenticate the consumer. The challenge questions may be static where the same questions are asked for each purchase transaction or dynamic where different questions may be asked over time.

The questions asked may also have static or dynamic (semi-dynamic or fully dynamic) answers. For example, the question "What is your birthday?" requires a static answer, since the answer does not change. The question "What is your zip-code?" requires a semi-dynamic answer, since it could change or can change infrequently. Lastly, the question "What did you purchase yesterday at 4 pm?" would require a dynamic answer since the answer changes frequently. Thus, in preferred embodiments, the challenge questions would preferably be based on "real time" information that the issuer would most likely possess. For example, the consumer might be asked a more specific question such as "Did you eat out at a Mexican restaurant last night?" By providing more specific knowledge based consumer challenges, the authentication of the consumer is ensured.

In one embodiment, the method includes conducting a transaction such as a purchase transaction using a portable consumer device. The portable consumer device may be a credit card or the like. The purchase transaction may take place at a merchant that has an access device such as a point of sale terminal.

The consumer may use the portable consumer device to interact with an access device such as a point of sale terminal and initiate the process. The point of sale terminal may initiate and then generate an authorization request message, which may thereafter be sent to a payment processing network, and then subsequently to the issuer of the portable consumer device. When the authorization request message is received, by either the payment processing network or the issuer, it is analyzed. A challenge message, which can be dynamic or semi-dynamic in nature, is then generated, and is sent to the consumer. The challenge message could be sent back to the access device, or to the consumer's portable consumer device (e.g., if the portable consumer device is a mobile phone).

The consumer then provides a response to the challenge message. The challenge response message is received from the consumer. The challenge response message is then verified and if it is verified, the authorization response message is analyzed to determine if the transaction is authorized (e.g., there are sufficient funds in the consumer's account or there is sufficient credit in the consumer's account). If the transaction is authorized, the issuer and also the payment processing network send an authorization response message to the consumer. The authorization response message indicates whether or not the transaction is authorized.

In the specific embodiments described above and below, challenge questions are described in detail, but embodiments of the invention are not limited thereto. Embodiments of the invention can generally relate to the use of challenge messages, which may include challenge questions. In some embodiments, as will be described in further detail below, challenge messages may or may not be read by a consumer, and may challenge the authenticity of the consumer in direct or indirect ways. Examples of challenge questions include questions relating to the consumer's portable consumer device (e.g., what is the CVV2 or card verification value on the back of your card?), the consumer's location (e.g., what is your zip code?), the consumer's mobile or regular phone (e.g., what is your mobile phone number?), the consumer's personal information (e.g., what is your mother's maiden name?), etc. Examples of challenge messages that are not questions that are specifically answered by the consumer include messages which automatically query a phone as to its location or phone number, and cause the retrieval of such information. Another example of a challenge message may be a message which supplies a code (or other authentication token) to a phone, and the use of that code at an access device authenticates the user.

I. Systems

FIG. 1 shows an exemplary system 20 according to an embodiment of the invention. Other systems according to other embodiments of the invention may include more or less components than are shown in FIG. 1.

The system 20 shown in FIG. 1 includes a merchant 22 and an acquirer 24 associated with the merchant 22. In a typical payment transaction, a consumer 30 may purchase goods or services at the merchant 22 using a portable consumer device 32. The merchant 22 could be a physical brick and mortar merchant or an e-merchant. The acquirer 24 can communicate with an issuer 28 via a payment processing network 26. The merchant 22 could alternatively be connected directly to the payment processing network 26.

The consumer 30 may be an individual, or an organization such as a business that is capable of purchasing goods or services. In other embodiments, the consumer 30 may simply be a person who wants to conduct some other type of transaction such as a money transfer transaction or a transaction at an ATM. The consumer 30 may optionally operate a wireless phone 35.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones (e.g., the phone 35 described above), personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

Figure 2:
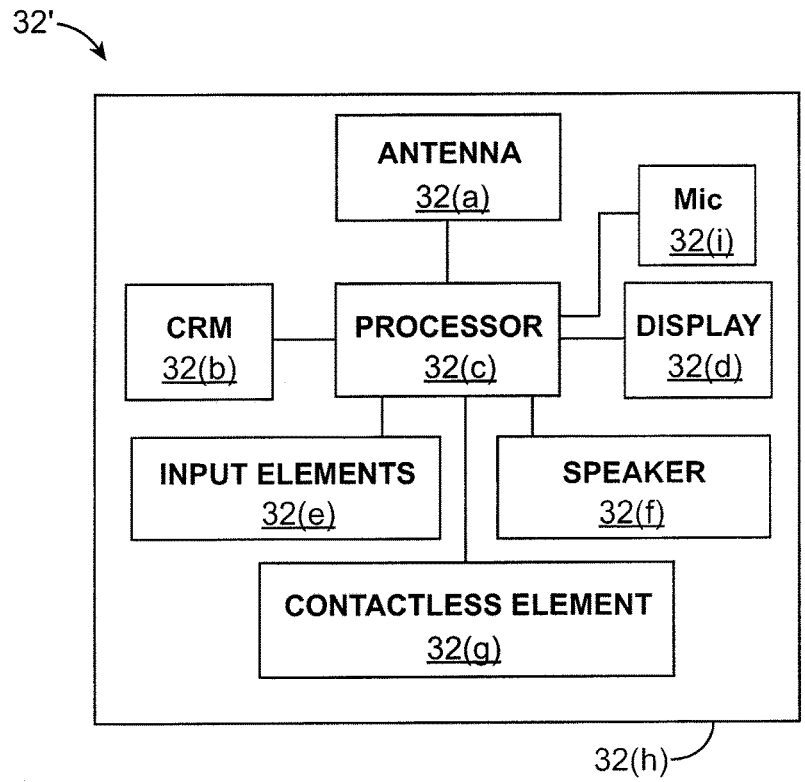
FIG. 2 shows a block diagram of one type of portable consumer device.

An exemplary portable consumer device 32' in the form of a phone may comprise a computer readable medium and a body as shown in FIG. 2. (FIG. 2 shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN data, plus other discretionary data.

The portable consumer device 32 may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32 and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32 and an interrogation device. Thus, the portable consumer device 32 is capable of communicating and transferring data and/or control instructions via both cellular network and near field communications capability.

The portable consumer device 32 may also include a processor 32(c) (e.g., a microprocessor) for processing the functions of the portable consumer device 32 and a display 32(d) to allow a consumer to see phone numbers and other information and messages. The portable consumer device 32 may further include input elements 32(e) to allow a consumer to input information into the device, a speaker 32(f) to allow the consumer to hear voice communication, music, etc., and a microphone 32(i) to allow the consumer to transmit her voice through the portable consumer device 32. The portable consumer device 32 may also include an antenna 32(a) for wireless data transfer (e.g., data transmission).

If the portable consumer device is in the form of a debit, credit, or smartcard, the portable consumer device may also optionally have features such as magnetic strips. Such devices can operate in either a contact or contactless mode.

Figure 3:
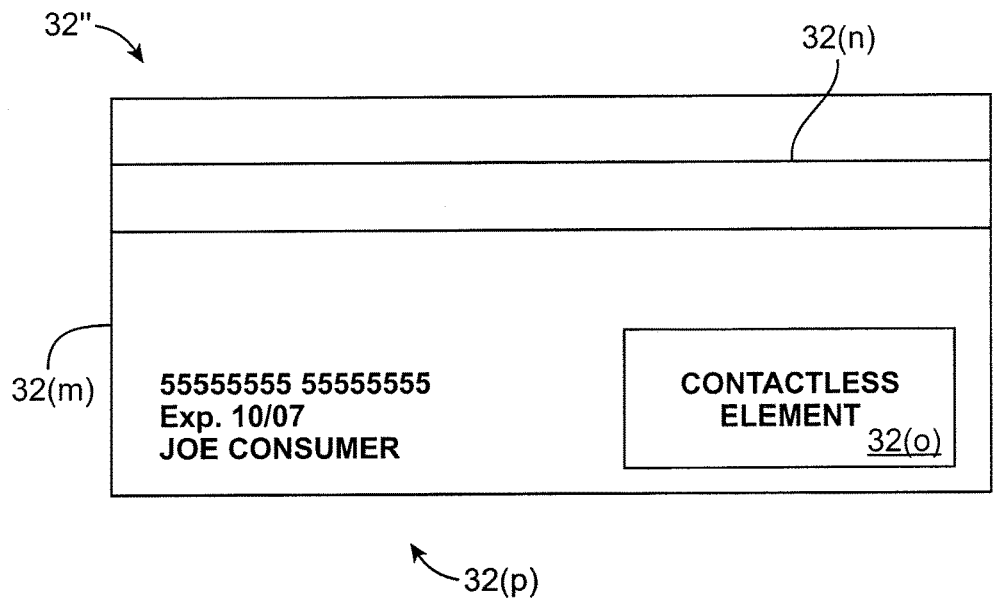
FIG. 3 shows a plan view of a second type of portable consumer device.

An example of a portable consumer device 32" in the form of a card is shown in FIG. 3. FIG. 3 shows a plastic substrate 32(m). A contactless element 32(o) for interfacing with an access device 34 may be present on or embedded within the plastic substrate 32(m). Consumer information 32(p) such as an account number, expiration date, and consumer name may be printed or embossed on the card. Also, a magnetic stripe 32(n) may also be on the plastic substrate 32(m).

As shown in FIG. 3, the portable consumer device 32" may include both a magnetic stripe 32(n) and a contactless element 32(o). In other embodiments, both the magnetic stripe 32(n) and the contactless element 32(o) may be in the portable consumer device 32". In other embodiments, either the magnetic stripe 32(n) or the contactless element 32(o) may be present in the portable consumer device 32".

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

As shown in FIG. 1, the payment processing network 26 may comprise a server 26(a), which may comprise a challenge question engine 26(a)-1. The server 26(a) may also be in communication with a transaction history database 26(b) and a challenge question database 26(c). As will be explained in further detail below, the challenge question engine 26(a)-1 may simply extract challenge questions from the challenge question database 26(c). Alternatively or additionally, the challenge question engine 26(a)-1 may generate challenge questions using information in the transaction history database 26(b).

As will be explained in further detail below, the challenge questions may be static or dynamic in nature. For example, the challenge question engine 26(a)-1 may receive an authorization request message, and the authorization request message may include the consumer's account number, as well as the purchase amount. It may then look up the consumer's account number, and any consumer information associated with the consumer's account number. It may thereafter retrieve suitable questions from the challenge question database 26(c) or may generate suitable challenge questions on its own. For instance, in some cases, the challenge question engine 26(a)-1 may retrieve the question "What is your mobile phone number?" from the challenge question database 26(c) after receiving an authorization request message. Alternatively, the challenge question engine 26(a)-1 may generate a dynamic question such as "Did you use this credit card at McDonald's last night?" The information pertaining to the particular restaurant that the consumer 30 was at the preceding day could be retrieved from the transaction history database 26(b).

The challenge question database 26(c) may be populated with questions of any suitable type. The questions may relate to a past location (e.g., the consumer's current home, the city that the consumer recently visited) or current location (e.g., the current location of the store that the consumer is currently at), the type or name of the merchant that the consumer is presently visiting or has visited in the past, the consumer's family or personal data (e.g., name, phone number, social security number, etc.), etc. The questions in the challenge question database 26(c) may be generated by the challenge question engine 26(a)-1 and subsequently stored in the challenge question database 26(c).

Alternatively, or additionally, the challenge questions may be generated from an external source and then subsequently stored in the challenge question database 26(c). For example, the consumer 30 may use a browser on a personal computer or the like to supply specific challenge questions to the server 26(a) via a communication medium (not shown) such as the Internet.

In some embodiments, a consumer may determine the kinds and/or quantity of challenge questions to ask himself or herself. For example, the consumer may specify that the consumer wants to be asked three challenge questions if the consumer visits a jewelry store, but only one question if the consumer visits a fast food restaurant. The types of questions posed by the consumer may be based on the merchant type, frequency of purchasing, etc. Some concepts relating to user-defined authorization parameters are described in U.S. patent application Ser. No. 10/093,002, filed on Mar. 5, 2002, which is herein incorporated by reference in its entirety for all purposes.

In preferred embodiments, the challenge questions are derived from past transaction data in the transaction history database 26(b). The consumer 30 may conduct many, many transactions with the payment processing network 26 (and/or the issuer 28) over time. This consumer transaction information may be stored in the transaction history database 26(b) over time, and challenge questions may be generated using the transaction information (step 158). The past transaction information provides a good basis for authenticating the consumer 30, since the consumer 30 will know about what transactions that the consumer 30 has conducted in the past. For example, the consumer 30 may have used his credit card to pay for a hotel room in New York the previous day, and on the next day may be asked a question such as "Did you stay at a hotel in New York yesterday?" In another example, the consumer 30 may have purchased an item that is more than $2000 the day before, and on the next day may be asked "Did you make a purchase for more than $2000 yesterday?" The questions/answers that are presented to the consumer 30 may be free form in nature and/or may include pre-formatted answers such as multiple choice or true-false answers from which the user may select.

The merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

The issuer 28 may be a bank or other organization that may have an account associated with the consumer 30. The issuer 26 may operate a server 28(a) which may have a challenge question engine 28(a)-1. A transaction history database 26(b) and a challenge question database 28(c) may be in communication with the server 28(a). The issuer server 28(a), challenge question engine 28(a)-1, transaction history database 26(b), and challenge question database 28(c) may operate in the same way or a different way than the payment processing network server 28(a), challenge question engine 28(a)-1, transaction history database 28(b), and challenge question database 28(c). The above-descriptions as to elements 26(a), 26(a)-1, 26(b), and 26(c) may apply to elements 28(a), 28(a)-1, 28(b), and 28(c).

Embodiments of the invention are not limited to the above-described embodiments. For example, although separate functional blocks are shown for an issuer, payment processing network, and acquirer, some entities perform all or any suitable combination of these functions and may be included in embodiments of invention. Additional components may also be included in embodiments of the invention.

Figure 7:
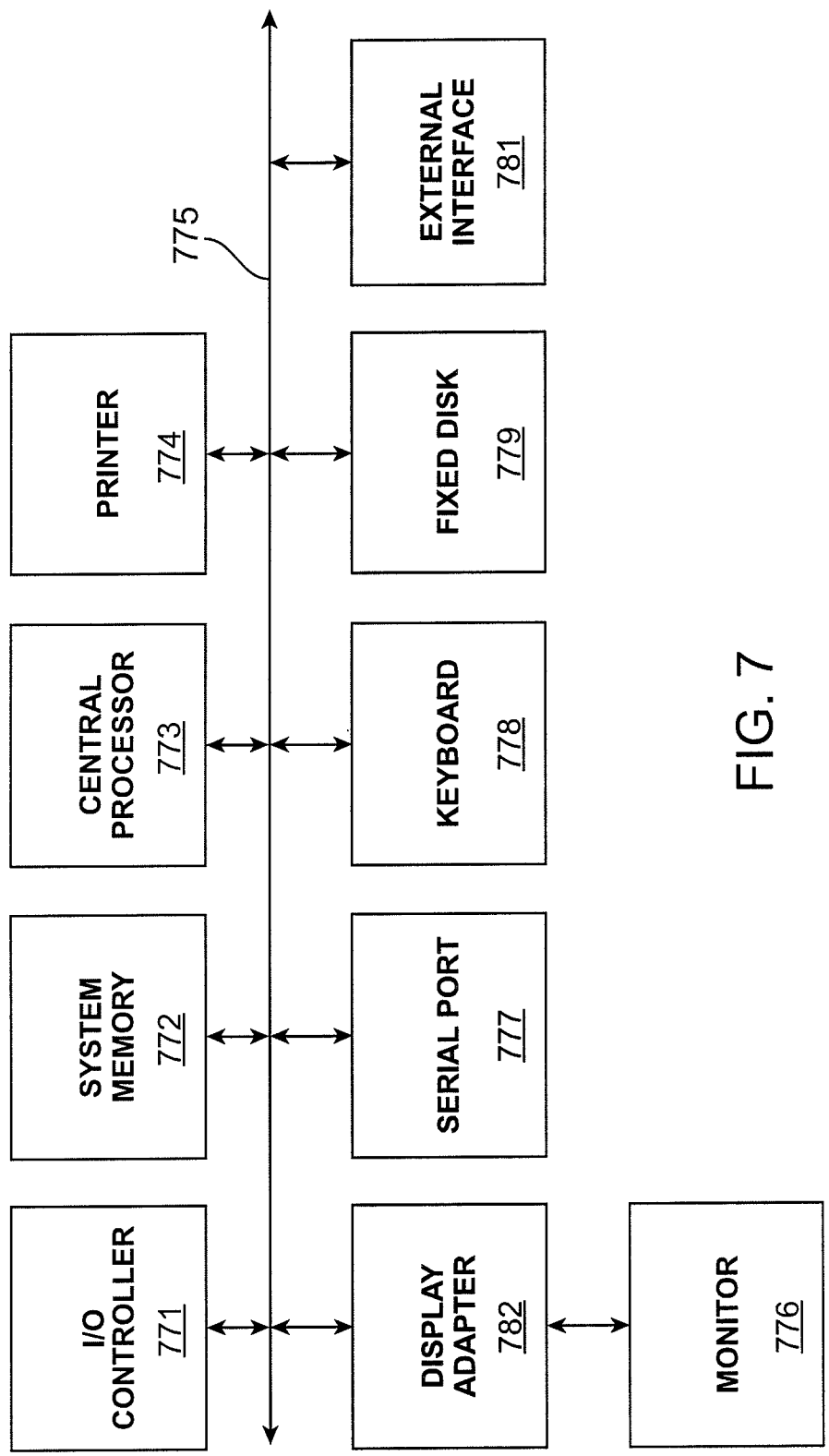
FIG. 7 shows a block diagram of a computer apparatus.

FIG. 7 shows typical components or subsystems of a computer apparatus. Such components or any subset of such components may be present in various components shown in FIG. 1, including the access device 34, server computers 26(a), 28(a), etc. The subsystems shown in FIG. 7 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus 775 allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

II. Methods

Methods according to embodiments of the invention can be described with reference to FIGS. 1 and 4. In a typical purchase transaction, the consumer 30 purchases a good or service at the merchant 22 using a portable consumer device 32 such as a credit card. The consumer's portable consumer device 32 can interact with an access device 34 such as a POS (point of sale) terminal at the merchant 22 (step 102). For example, the consumer 30 may take a credit card and may swipe it through an appropriate slot in the POS terminal. Alternatively, the POS terminal may be a contactless reader, and the portable consumer device 32 may be a contactless device such as a contactless card.

A first authorization request message is then forwarded to the acquirer 24. After the acquirer 24 receives the first authorization request message, the first authorization request message is then sent to the payment processing network 26 (step 104). The first authorization request message is then received at the payment processing network server 26(*a*) and the payment processing network server 26(*a*) then determines if a challenge is needed (step 106).

Various criteria may be used to determine if a challenge is needed. For example, the payment processing network server 26(*a*) may determine that the particular transaction is a high value transaction (e.g., greater than $1000) and that a challenge is therefore appropriate. In another example, the payment processing network server 26(*a*) may determine that there is something suspicious about the present transaction and may thereafter determine that a challenge is appropriate. For example, the payment processing network server 26(*a*) may determine that the portable consumer device 32 is currently being used at a location which is different from the consumer's home state, and the consumer's recent purchase history suggests that the consumer is not traveling.

Once it has been determined that a challenge is appropriate for the present transaction, the challenge question engine 26(*a*)-1 may then fetch (local or remote) a challenge question (step 108). In some embodiments, the challenge question engine 26(*a*)-1 may retrieve the question from the challenge question database 26(*c*).

At this point, rather than sending the first authorization request message to the issuer 26, the payment processing network 26 sends a first authorization response message back to the access device 34 via the merchant 22 and the acquirer 24 (step 110). The first authorization response message may contain data representing the challenge request that was previously obtained by the challenge question engine 26(*a*)-1. The challenge request may be a challenge question sent by the backend or an order to the access device to issue a challenge based on a set of preloaded question in the access device. The first authorization response message may be characterized as an initial decline, since it does not indicate approval of the transaction.

Once the challenge question is received at the access device 34, the consumer 30 supplies the challenge response to the access device 34. The challenge response may be supplied to the access device 34 in any suitable manner (e.g., through a keypad, contactless reader, etc.). Once the access device 34 receives the challenge response, the access device 34 then forwards the challenge response to the payment processing network server 26(*a*) via the merchant 22 and the acquirer 24, and it is received by them (step 112). The challenge response (or the challenge and response or the challenge pointer and response) message may be part of a second authorization request message.

The payment processing network server 26(*a*) then validates the challenge response message (step 114). If the challenge response message is not validated, then the payment processing network server 26(*a*) may send a response message back to the access device 34 indicating that the transaction is not approved. Alternatively or additionally, the payment processing network server 26(*a*) may send another challenge question to the access device 34. On other hand, if the challenge is validated, the payment processing network server 26(*a*) may send the second authorization request message to the issuer 28 (step 116) along with an indication that the consumer 30 has satisfied any challenges posed by the payment processing network 26.

After the issuer 28 receives the second authorization request, the issuer 28, using the issuer server 28(*a*), determines if the transaction is authorized or is not authorized (step 118). The transaction may not be authorized because the consumer 30 has insufficient funds or credit. If the consumer 30 does have sufficient funds or credit, the issuer 28 may then send a second authorization response message indicating that the transaction is authorized back to the access device 34 via the payment processing network 26, the acquirer 24, and the merchant 22 (step 122).

At the end of the day, a normal clearing and settlement process can be conducted by the transaction processing system 26. A clearing process is a process of exchanging financial details between and acquirer and an issuer to facilitate posting to a consumer's account and reconciliation of the consumer's settlement position. Clearing and settlement can occur simultaneously.

A number of alternative embodiments are also possible. For example, the issuer 28 could generate challenge questions and send them to the consumer 30 instead of or in addition to the payment processing network 26. The challenge question engine 28(*b*)-1, the transaction history database 28(*b*), and the challenge question database 26(*c*) operated by the issuer 28 may be used in the same or different way as the above-described challenge question engine 26(*a*)-1, the transaction history database 26(*b*), and the challenge question database 26(*c*) operated by the payment processing network 26.

In the above-described embodiments, there are two authorization request messages that are sent to the payment processing network 26 (and/or the issuer 28). This is desirable, since existing payment processing systems have "timers" that are set at various points between the access device 34 and the issuer 28 during a payment authorization process. The timers time how long various events should take place during the payment authorization process. The timers may be set and embodied as computer code at the acquirer 24, the payment processing network 26, and the issuer 28. For example, the timers at the acquirer 24, payment processing network 26, and issuer 28 may be respectively set to 3 seconds, 6 seconds, and 10 seconds. If an authorization request message is not received within these respective times, then some event may be triggered. For instance, an error message may be sent back to the access device 34 requesting that the merchant 22 resubmit the authorization request message, if an authorization request message is not received at the issuer 28 within 10 seconds. If a challenge request is created during the authorization process and before the authorization request message reaches the issuer 28, the issuer's timer may trigger an event indicating that an error has occurred. Creating challenge requests and responses during a single authorization process could potentially conflict with pre-existing timers in a payment system.

By using at least two authorization request messages in two separate authorization processes, the above-described timers are advantageously not affected. The timers need not be changed to send challenge questions to the consumer 30. This allows embodiments of the invention to be used with an existing payments infrastructure and widespread changes are not needed in embodiments of the invention. In comparison, if the retrieval of a challenge question during a payment authorization process occurs using a single authorization request message, this may delay the authorization request message and may necessitate changes in timers present in a payment processing system.

The at least two authorization request messages may have information such as BINs (bank identification numbers), transaction amounts, account numbers, service codes, etc. They may also contain the same transaction amount for the transaction being conducted, and/or different transaction amounts. For example, the first authorization request message may have the actual transaction amount, and the second authorization request message may have a zero dollar amount or other identifier to indicate that the prior authentication request with a transaction amount has already been submitted. A transaction code may be used to link the first and second authorization requests in some embodiments.

Figure 4:
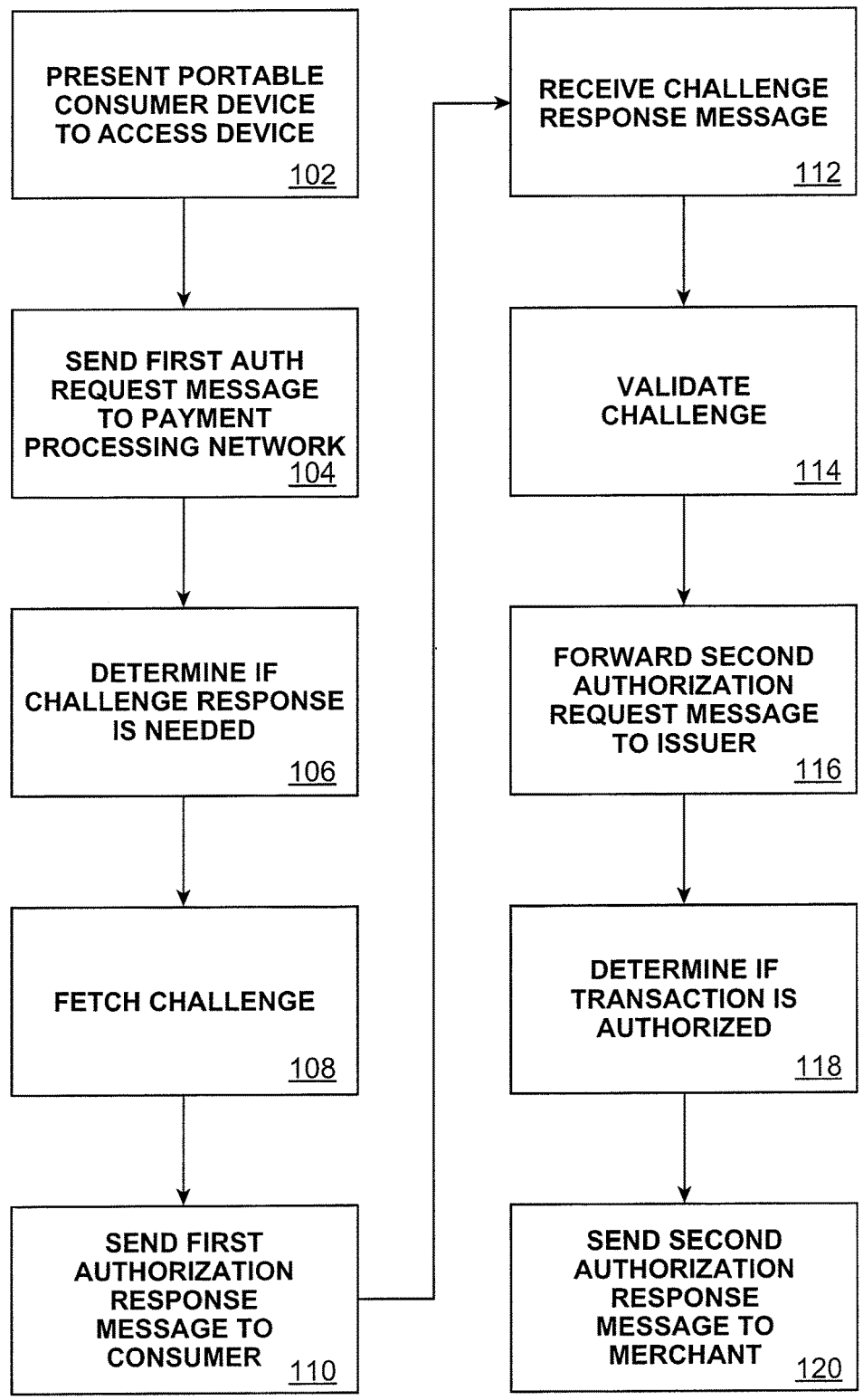
FIG. 4 shows a flowchart illustrating a method according to an embodiment of the invention.

The method described with respect to FIG. 4 can be characterized as a "closed channel" process since the access device 34 receives a challenge question and provides a response to the challenge question. However, other embodiments of the invention may use open channel solutions whereby a challenge question may be sent to a device other than the access device which sent the first authorization response message.

Examples of open channel methods according to embodiments of the invention can be described with reference to FIGS. 1 and 5. In a typical purchase transaction, the consumer 30 purchases a good or service at the merchant 22 using a portable consumer device 32 such as a credit card. The consumer's portable consumer device 32 can interact with an access device 34 such as a POS (point of sale) terminal at the merchant 22 (step 202). For example, the consumer 30 may take a credit card and may swipe it through an appropriate slot in the POS terminal. Alternatively, the POS terminal may be a contactless reader, and the portable consumer device 32 may be a contactless device such as a contactless card.

A first authorization request message is then forwarded to the acquirer 24. After receiving the first authorization request message, the first authorization request message is then sent to the payment processing network 26 (step 204). The first authorization request message is then received at the payment processing network server 26(a) and the payment processing network server 26(a) then determines if a challenge is needed (step 206).

Various criteria may be used to determine if a challenge is needed. For example, the payment processing network server 26(a) may determine that the particular transaction is a high value transaction (e.g., greater than $1000) and that a challenge is therefore appropriate. In another example, the payment processing network server 26(a) may determine that there is something suspicious about the present transaction and may thereafter determine that a challenge is appropriate.

Once it has been determined that a challenge is appropriate for the present transaction, the challenge question engine 26(a)-1 may then fetch (local or remote) a challenge question (step 208). In some embodiments, the challenge question engine 26(a)-1 may retrieve the question from the challenge question database 26(c).

Rather than sending the first authorization request message to the issuer 26, and rather than sending a first authorization response message back to the access device 34, the payment processing network 26 sends a first authorization response message back to the consumer's mobile phone 35 (step 210) or other type of access device. The first authorization response message may be sent back to the consumer's mobile phone 35. This can be done directly or through some intermediate entity. The first authorization response message may contain data representing the challenge request that we previously obtained by the challenge question engine 26(a)-1. The first authorization response message may be characterized as an initial decline, since it does not indicate approval of the transaction.

Once the challenge question is received at the mobile phone 35, the consumer 30 supplies the challenge response to the access device 34 (step 212) The access device 34 then forwards the challenge response to the payment processing network server 26(a) via the merchant 22 and the acquirer 24, and it is received by them (step 214). The challenge response message may be part of a second authorization request message.

Figure 5:
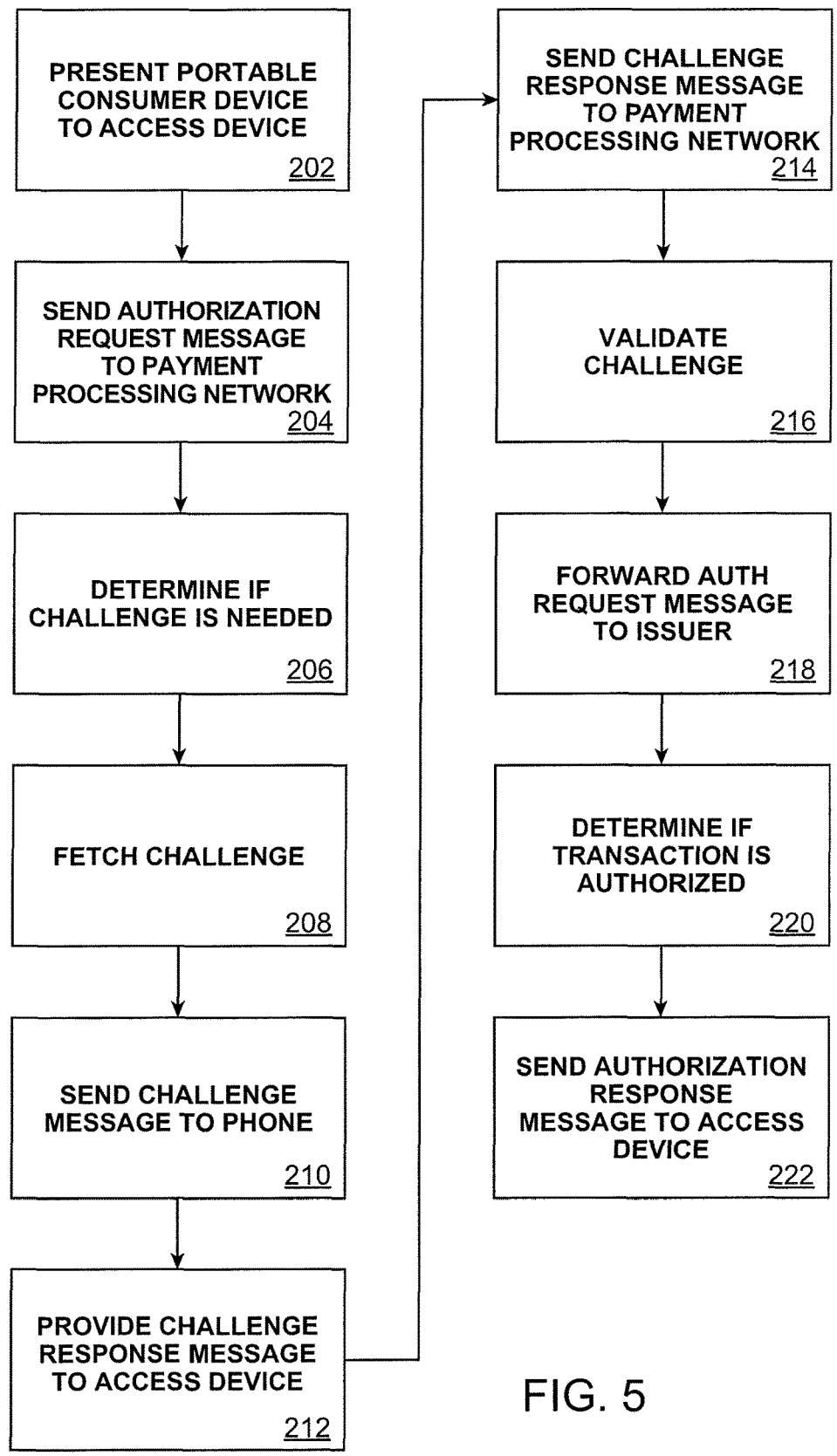
FIG. 5 shows another flowchart illustrating another method according to an embodiment of the invention.

Note that although challenge questions that the user actively answers are described in detail with respect to FIG. 5, other types of challenge requests may be sent to the mobile phone 35. For example, in some cases, the challenge requests may not require an answer that is actively provided by the consumer 30. Passive answers to challenge requests may be provided. For example, in some embodiments, the challenge request supplied to the mobile phone 35 may be a query regarding the physical location of the mobile phone 35. The mobile phone 35 may have a GPS device or other location device and this information (or other information such as a cryptogram, etc.) may be transmitted to the payment processing network 26, and the payment processing network 26 may authenticate the consumer 30 using this location information.

Once the payment processing network server 26(a) receives the challenge response message, the payment processing network server 26(a) then validates the challenge response message (step 216). If the challenge response message is not validated, then the payment processing network server 26(a) may send a response message back to the access device 34 indicating that the transaction is not approved. Alternatively or additionally, the payment processing network server 26(a) may send another challenge message to the access device 34 and/or the mobile phone 35. On other hand, if the challenge is validated, the payment processing network server 26(a) may then send the second authorization request message to the issuer 28 (step 218) along with an indication that the consumer 30 has satisfied any challenges posed by the payment processing network 26.

After the issuer 28 receives the second authorization request, the issuer 28 using the issuer server 28(a) determines if the transaction is authorized or is not authorized (step 220). The transaction may not be authorized because the consumer 30 has insufficient funds or credit. If the consumer 30 does have sufficient funds or credit, the issuer 28 may then send a second authorization response message indicating that the transaction is authorized back to the access device 34 via the payment processing network 26, the acquirer 24, and the merchant 22 (step 222).

At the end of the day, a normal clearing and settlement process can be conducted by the transaction processing system 26. A clearing process is a process of exchanging financial details between and acquirer and an issuer to facilitate posting to a consumer's account and reconciliation of the consumer's settlement position. Clearing and settlement can occur simultaneously.

A number of alternative embodiments are also possible. For example, the issuer 28 could generate challenge questions and send them to the mobile phone 35 instead of or in addition to the payment processing network 26. The challenge question engine 28(b)-1, the transaction history database 28(b), and the challenge question database 26(c) operated by the issuer 28 may be used in the same or different way as the above-described challenge question engine 26(a)-1, the transaction history database 26(b), and the challenge question database 26(c) operated by the payment processing network 26.

In another embodiment, instead of sending a challenge question, the payment processing network server 26(a) may send an electronic coupon to the consumer's mobile phone 35. The payment processing network 26 may determine that a challenge is appropriate and may send the electronic coupon to the phone 34. Upon receipt of this electronic coupon, the consumer may then be prompted to use the coupon at the access device 34. If the consumer 30 uses the coupon at the access device 34, then access device 34 forwards the coupon to the payment processing network 26, and receipt of the coupon by the payment processing network 26 indicates that the consumer 30 is authenticated. It is presumed that the consumer 30 is authentic since a non-authentic consumer would not be in possession of the consumer's phone 35.

III. Transaction Authentication

The above-described challenge authentication process is a process for authenticating a consumer and can be part of a larger overall "transaction authentication" process.

Figure 6:
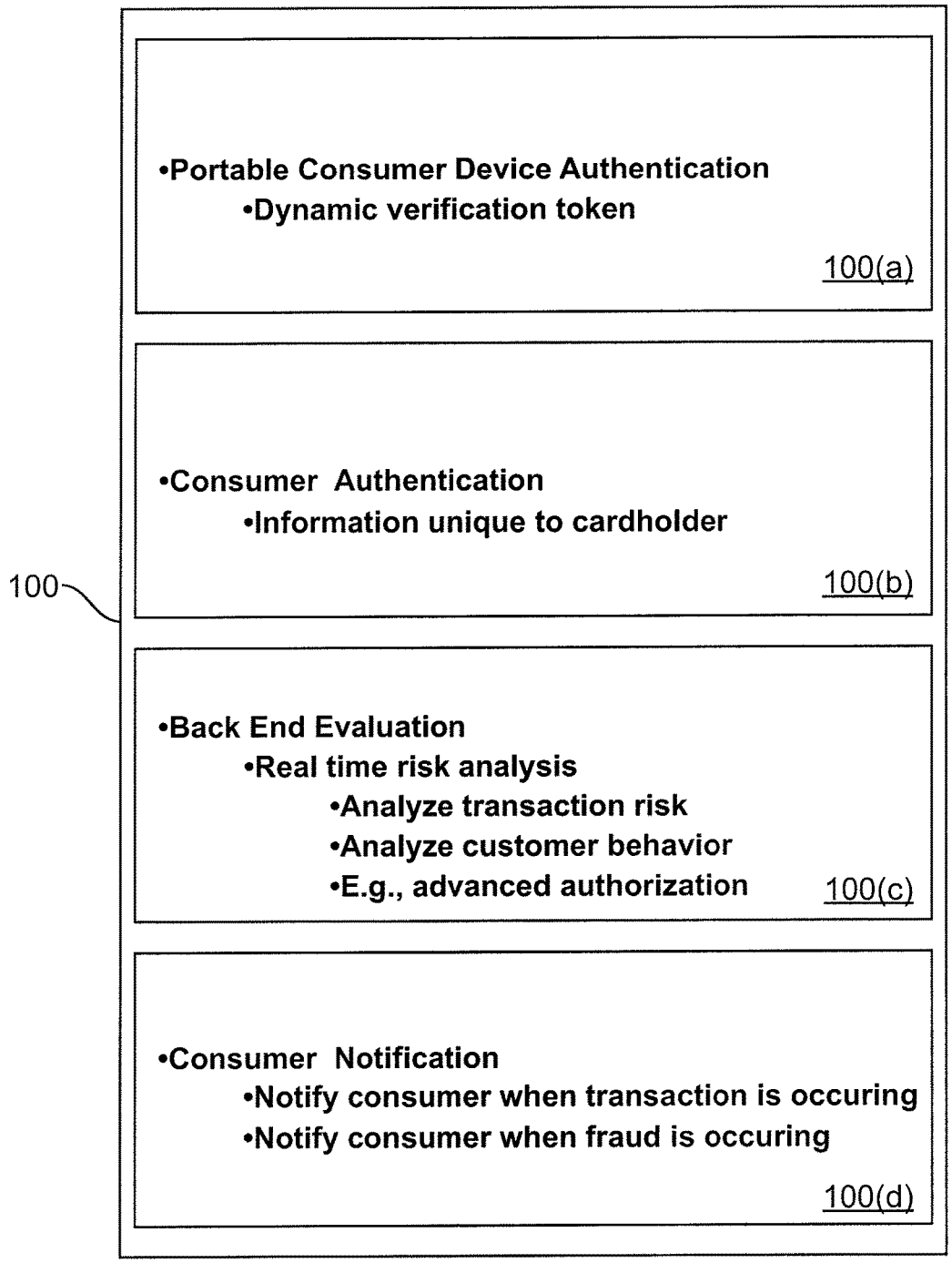
FIG. 6 shows a block diagram of certain authentication aspects of embodiments of the invention.

FIG. 6 shows a conceptual block diagram 100, the authentication of a purchase transaction can have various aspects. Such aspects include portable consumer device authentication 100(a), consumer authentication 100(b), back end processing including real time risk analysis 100(c), and consumer notification of the purchase transaction 100(d).

Portable consumer device authentication relates to the authentication of the portable consumer device. That is, in a portable consumer device authentication process, a determination is made as to whether the portable consumer device that is being used in the purchase transaction is the authentic portable consumer device or a counterfeit portable consumer device. Specific exemplary techniques for improving the authentication of a portable consumer device include:

Dynamic CVV on portable consumer devices such as magnetic stripe cards
Card security features (existing and new)
Contactless chips (limited use)
Magnetic stripe identification
Card Verification Values (CVV and CVV2)
Contact EMV chips Consumer authentication relates to a determination as to whether or not the person conducting the transaction is in fact the owner or authorized user of Knowledge-based challenge-responses
Hardware tokens (multiple solution options)
OTPs (one time password, limited use)
AVSs (not as a stand alone solution)
Signatures
Software tokens
PINs (online/offline)
User IDs/Passcodes
Two-channel authentication processes (e.g., via phone)
Biometrics Back end processing relates to processing that may occur at the issuer or payment processing network, or other non-merchant location. Various processes may be performed at the "back end" of the payment transaction to help ensure that any transactions being conducted are authentic. Back end processing may also prevent transactions that should not be authorized, and can allow transactions that should be authorized.

Lastly, consumer notification is another aspect of transaction authentication. In some cases, a consumer may be notified that a purchase transaction is occurring or has occurred. If the consumer is notified (e.g., via cell phone) that a transaction is occurring using his portable consumer device, and the consumer is in fact not conducting the transaction, then appropriate steps may be Purchase notification via SMS
Purchase notification via e-mail
Purchase notification by phone Other details regarding some of the above-described aspects are provided in U.S. Provisional Patent Application No. 60/815,059, filed on Jun. 19, 2006, U.S. Provisional Patent Application No. 60/815,430 filed on Jun. 20, 2006, and U.S. Provisional Patent Application No. 60/884,089 filed on Jan. 9, 2007, which are herein incorporated by reference in their entirety for all purposes. The specific details of the specific aspects may be combined in any suitable manner without departing from the spirit and scope of embodiments of the invention. For example, portable consumer device authentication, consumer authentication, back end processing, and consumer transaction notification may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    determining a transaction amount and an account number associated with a portable consumer device;
    initiating an authorization request message for a transaction, wherein the authorization request message comprises the transaction amount and the account number;
    sending the authorization request message to an issuer associated with the portable consumer device, the transaction amount added to payment transaction history of a consumer associated with the account number;

receiving a challenge message, wherein the challenge message is dynamic and wherein the consumer's payment transaction history is used to create the challenge message;
initiating a challenge response message, wherein the challenge response message is responsive to the challenge message; and
receiving an authorization response message, wherein the authorization response message indicates whether or not the transaction is authorized by the issuer associated with the portable consumer device.

2. The method of claim 1 wherein the authorization request message and the challenge message are initiated and received, respectively, by at least one of a merchant who is a party to the transaction or the consumer.

3. The method of claim 1 wherein the portable consumer device is a card or a mobile phone.

4. The method of claim 1 wherein the challenge message includes a question.

5. The method of claim 4 wherein the question asks the consumer if the consumer did or did not previously make a particular purchase.

6. The method of claim 1 wherein the authorization request message is sent to the issuer via a payment processing network and the challenge message is received from the issuer via the payment processing network; and the method further comprising:
sending the challenge response message to the payment processing network; and
if the consumer provides a correct challenge response message:
receiving the authorization response message from the issuer of the portable consumer device after the authorization request message is sent to the issuer.

7. The method of claim 6 wherein the transaction involves a merchant, and wherein the authorization response message is sent to the portable consumer device.

8. The method of claim 1 wherein the challenge message is received from the issuer, and the method further comprising:
sending the challenge response message to the issuer.

9. The method of claim 2, further comprising:
implementing a timer to determine a length of time for authorization of the transaction.

10. The method of claim 1 wherein the challenge response message is part of a second authorization request message.

11. The method of claim 10 wherein the second authorization request message comprises a zero dollar amount.

12. The method of claim 1, further comprising:
providing a second challenge to the consumer, wherein the second challenge requests a consumer's identification.

13. The method of claim 1 wherein the authorization response message indicates that the transaction is authorized when an account associated with the portable consumer device has sufficient funds or credit.

14. The method of claim 1 wherein the challenge response message includes a multiple choice or true-false answer that was selected by the consumer.

15. A non-transitory computer readable medium comprising code, executable by a processor, to implement a method comprising:
determining a transaction amount and an account number associated with a portable consumer device;
initiating an authorization request message for a transaction, wherein the authorization request message comprises the transaction amount and the account number;
sending the authorization request message to an issuer associated with the portable consumer device, the transaction amount added to payment transaction history of a consumer associated with the account number;
receiving a challenge message, wherein the challenge message is dynamic and wherein the consumer's payment transaction history is used to create the challenge message;
initiating a challenge response message, wherein the challenge response message is responsive to the challenge message; and
receiving an authorization response message, wherein the authorization response message indicates whether or not the transaction is authorized by the issuer associated with the portable consumer device.

16. A phone comprising the non-transitory computer readable medium of claim 15.

17. An access device comprising:
a processor; and
a non-transitory computer readable medium programmed to perform a method comprising:
determining a transaction amount and an account number associated with a portable consumer device;
initiating an authorization request message for a transaction, wherein the authorization request message comprises the transaction amount and the account number;
sending the authorization request message to an issuer associated with the portable consumer device, the transaction amount added to payment transaction history of a consumer associated with the account number;
receiving a challenge message, wherein the challenge message is dynamic and wherein the consumer's payment transaction history is used to create the challenge message;
initiating a challenge response message, wherein the challenge response message is responsive to the challenge message; and
receiving an authorization response message, wherein the authorization response message indicates whether or not the transaction is authorized by the issuer associated with the portable consumer device.

* * * * *